United States Patent Office 3,238,260
Patented Mar. 1, 1966

3,238,260
PRODUCTION OF IONONE COMPOUNDS
Heinrich Pasedach and Kurt Schneider, Ludwigshafen (Rhine), Germany, assignors to Badische Anilin- & Soda-Fabrik Aktiengesellschaft, Ludwigshafen (Rhine), Germany
No Drawing. Filed Mar. 8, 1962, Ser. No. 178,281
Claims priority, application Germany, Mar. 11, 1961, B 61,629, B 61,631, B 61,632; Jan. 8, 1962, B 65,434
8 Claims. (Cl. 260—587)

This invention relates to a process for the production of ionone compounds in a new way by a three-stage process. The invention further relates to the individual stages of the said process. The invention also relates to intermediate products which may serve for the production of ionone compounds.

It is known that ionone compounds are obtained by cyclizing 2,6 - dimethylundecatriene - (2,6,8) - one - (10) (pseudoionone), 2,3,6-trimethylundecatriene-(2,6,8)-one-(10) (pseudoirone) or 2,6-dimethylundecatriene-(1,6,8)-one-(10) with acid reagents. This process has been known for a long time. Yields of 70 to 75% of the theory are obtained by this method. Pseudoionone can be obtained, for example, from the citral contained in lemongrass oil by condensation with acetone in the presence of an alkaline condensing agent. Since the availability of lemon-grass oil as a natural product is subject to heavy fluctuations, other starting materials have been sought. For example it is possible to start from 2-methylheptene-(2)-one-(6) which is first ethinylated to 2,6-dimethyloctene-(2)-yne-(7)-ol-(6) (dehydrolinalool). This compound is then reacted with diketene or an acetoacetic acid ester to form pseudoionone. In this step of the process however a five-membered cyclic ketone of the formula:

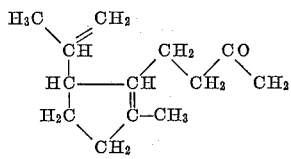

is formed in considerable amounts with a consequent decrease in yield. The total yield of the process, which starts from 2-methylheptene-(2)-one-(6), is therefore unsatisfactory.

The pseudoionone can also be obtained by acetylating dehydrolinalool and reacting the acetylation product with silver acetate in glacial acetic acid as a solvent to form 8-acetoxy-2,6-dimethyloctatriene-(2,6,7) or 8,8-diacetoxy-2,6-dimethyloctadiene-(2,6). These compounds may then be condensed to form pseudoionone with acetone in the way of citral. This method comprises one step more than the one above referred to and moreover calls for tedious measures in the recovery of the reaction product from the reaction mixture.

It has also been known that dehydrolinalool can be reacted with isopropenyl ethers in inert solvents in an acid medium to form open-chain unsaturated ketones and these can be cyclized into ionone compounds. Isopropenyl ethers, however, are not readily accessible. In addition, dehydrolinalool cannot be converted completely into open-chain unsaturated ketones so that there is always some starting material left which must be separated from the end product.

It is an object of the present invention to provide a three-stage process for the production of ionone compounds which gives good total yields. Another object of the invention is to provide a process in which no undesired five-membered cyclic compounds are formed as byproducts. It is another object of the invention to cyclize to ionone compounds, intermediate products which hitherto have not been cyclized to six-membered cyclic derivatives.

A further object of the invention is to provide a process in which no natural products are used as starting materials and which therefore makes the production of ionone compounds independent of the fluctuations to which the availability of natural products is subject. A still further object of the invention is to provide a process with which no tedious measures in the recovery of the ionone compounds from the reaction mixtures are necessary. Still another object of the invention is to provide new intermediate products in the three-stage process for the production of ionone compounds. Other objects and advantages will become evident from the description hereinafter.

In accordance with this invention, the said objects and advantages are achieved by reacting ethinyl carbinols of the general formulae:

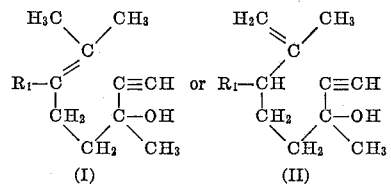

in a first stage with an alcohol $R_2OH$. In these formulae $R_1$ denotes hydrogen or methyl and $R_2$ denotes an aliphatic, cycloaliphatic or araliphatic radical. In a second stage the ethinyl carbinols resulting in the first stage, which contain an ether bridge and have the general formula:

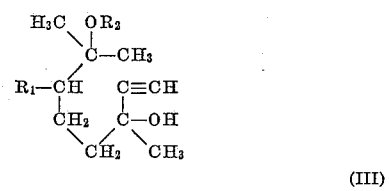

are reacted with a derivative of acetoacetic acid to form a mixture of compounds of the general formulae:

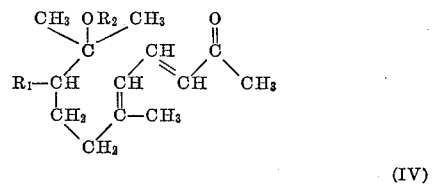

and

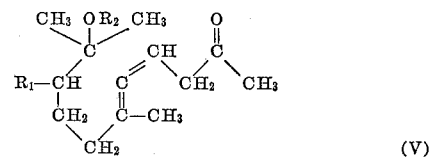

In the third stage of the process according to this invention, the compounds of the general formulae IV and V are cyclized, either alone or in admixture with each other, in acid medium to form ionone compounds of the general formulae:

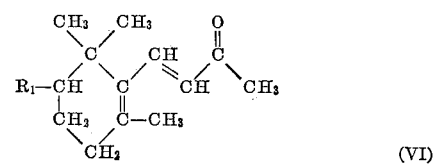

and/or

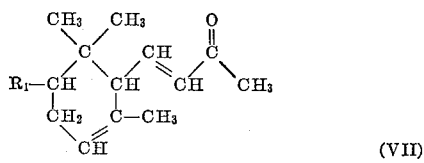

(VII)

In the Formulae III–VII $R_1$ and $R_2$ have the meanings given with reference to Formulae I and II.

The initial materials of the general Formulae I and II for the first stage may be obtained by ethinylation of unsaturated ketones of the general formulae:

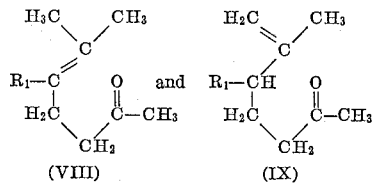

easily accessible from natural sources or synthetically. In the Formulae VIII and IX $R_1$ means methyl or hydrogen. The said ethinylation is carried out in conventional manner, i.e., with acetylene at a temperature comprised between minus 60° and plus 120° C., preferably between minus 40° and plus 80° C. and a pressure up to 50 atmospheres, as for example at atmospheric pressure or a pressure of 30 atmospheres, basic catalysts being used, such as acetylides, oxides, hydroxides, hydrides, amides and alcoholates, preferably those having from 1 to 5 carbon atoms, of alkali metals and alkaline earth metals. Quaternary ammonium basis, it is known, are also useful ethinylation catalysts. The reaction is carried out in the presence or absence of a solvent, such as liquid ammonia, tetrahydrofurane, glycol ether, cyclohexane and xylene.

To the unsaturated initial Compounds I and II aliphatic, cycloaliphatic or araliphatic alcohols may be added. These alcohols may be of a monohydric or polyhydric type and may be saturated or unsaturated containing one olefinic linkage. The reaction is easiest and simplest with primary alcohols. Examples of suitable alcohols are: methanol, ethanol, propanol, butanol, n-amyl alcohol, hexanol, isopropanol, isobutanol, isoamyl alcohol, allyl alcohol, crotyl alcohol, hexanediol-(1,6), butanetriol-(1,2,4) glycol, methylglycol, butylglycol, glycerin, trimethylolpropane, cyclopentanol, cyclohexanol, tetrahydrofurfurl alcohol, benzyl alcohol and β-phenylethyl alcohol.

Preferred alcohols are alkanols, alkanediols, alkanetriols or alkenols having up to twelve carbon atoms, which may contain alkoxy radicals with one to four carbon atoms, and monohydric araliphatic alcohols comprising seven to nine carbon atoms and having hydrocarbon structure.

Especially preferred among said alcohols are alkanols having one to four carbon atoms, in particular methanol, glycols with two to six carbon atoms and at least one primary hydroxyl group, and their half ethers with alkanols having one to four carbon atoms. When polyhydric alcohols are reacted, the relative proportion of the reactants may be so chosen that one or more moles of the branched, unsaturated initial material comes to add to one molecule of the polyol.

The alcohol is preferably used in excess of the equivalent amount, for example 1.1 to 20 moles of monohydric alcohol to one mole of either of the ethinyl carbinols I or II. The alcohol will then function as a solvent as well. Inert solvents, such as hydrocarbons or ethers, may however also be present during reaction.

Instead of ethinylating unsaturated ketones VIII and IX and reacting the ethinyl carbinols I and II thus obtainable with the alcohol $R_2OH$, it is also possible to add the latter to the unsaturated ketones VIII and IX first and then to ethinylate the saturated ketones X

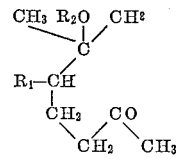

containing ether groups. The addition of the alcohol to the unsaturated ketones VIII and IX occurs under conditions equal to those under which the ethinyl carbinols I and II are reacted. The ethinylation of the saturated ketones X is also carried out in conventional manner as described above.

The reaction in the first stage of the process is carried out in the presence of acid reagents. The preferred acid reagents are strong or medium strength organic or inorganic acids and Friedel-Crafts catalysts. Examples are hydrogen chloride, sulfuric acid, phosphoric acid, trichloracetic acid, perchloric acid, boron fluoride etherate, p-toluene-sulfonic acid, naphthalene sulfonic acids, aluminum chloride and zinc chloride. The acid reagents are generally used in amounts of about 1 to 20% by weight with reference to the alcohol. Especially good results are achieved if the addition is done in the presence of acid ion exchangers. This will substantially simplify the further processing of the reaction mixture.

The first stage of the process is advantageously carried out at a temperature between 0 and 120° C. The most favorable temperature depends on the initial material used and in general lies between 20 and 70° C. At a temperature above 120° C., byproducts are formed in increasing amounts.

In the practice of our invention the process may be carried out, for example, by stirring the alcohol $R_2OH$ together with the initial material I and/or II and the catalyst for some time, for example, for six to sixty hours. After neutralizing the reaction mixture and separating the catalyst, the reaction product III is recovered by distillation. The reaction may be made continuous by passing the reaction mixture through a heated zone. Neutralization is unnecessary and the catalysts can be stripped in an especially simple manner if ion exchangers are used.

It is surprising that alcohols should add so smoothly to the olefinic double linkages of Compounds I and II or VIII and IX which contain at least eight or ten carbon atoms. It is known from Ind. Eng. Chem., 28 (1936), page 1186, that alcohols will add smoothly only to branched olefines with a small number of carbon atoms. With diisobutylene, for example, practically no addition of alcohols takes place. Although, as is known alcohols will add to α,β-unsaturated ketones, it would not have been expected that the activating influence of a keto group or even a —C≡C— triple linkage would extend to the γ,δ- or δ,ε-position.

The new compounds formed in the first stage of the process have the general formula:

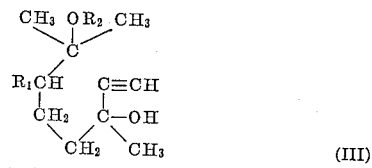

(III)

in which, as specified above, $R_1$ denotes a hydrogen atom or a methyl group and $R_2$ denotes an aliphatic, cycloaliphatic or araliphatic radical. Consistent with its meaning in the alcohol $R_2OH$, $R_2$ in the preferred compounds of the general formula III denotes a saturated hydrocarbon radical or an unsaturated hydrocarbon radical containing one olefinic linkage, the two types of radicals having up to twelve carbon atoms which may contain one or two hydroxyl groups or an alkoxy radical with one to four carbon atoms, or an aralkyl radical with seven to nine carbon atoms. As previously described and illustrated, $R_2$ may be alkyl of 1–12 carbons, alkoxyalkyl with 1–4 carbons in the alkoxy group and 1–12 carbons in the alkyl group, monohydroxy alkyl with 2–12 carbons, dihydroxy alkyl with 3–12 carbons, alkenyl with 3–12 carbons, alkoxyalkenyl with 1–4 carbons in the alkoxy group and 3–12 carbons in the alkenyl group, aralkyl with 7–9 carbons, cyclopentyl or cyclohexyl. In the compounds of Formula III which are especially preferred in the practice of our invention, $R_2$ denotes alkyl with one to four carbon atoms, hydroxyalkyl with two to six carbon atoms and alkoxyalkyl groups in which the alkoxy radical includes one to four carbon atoms and the alkyl radical includes two to six carbon atoms.

The new Compounds III have special odoriferous properties. They have a fruity, minty scent, some of them with a tinge of linalool and iris root, and can therefore be used as perfumes or as components of perfume formulations.

In the second stage of the process according to this invention, Compound III is reacted with a derivative of acetoacetic acid at a temperature between 0° and 500° C. to form compounds of the general Formulae IV and V. For example, 2-methoxy-2,6-dimethyloctine-(7)-ol-(6) reacts with diketene according to the following formula scheme:

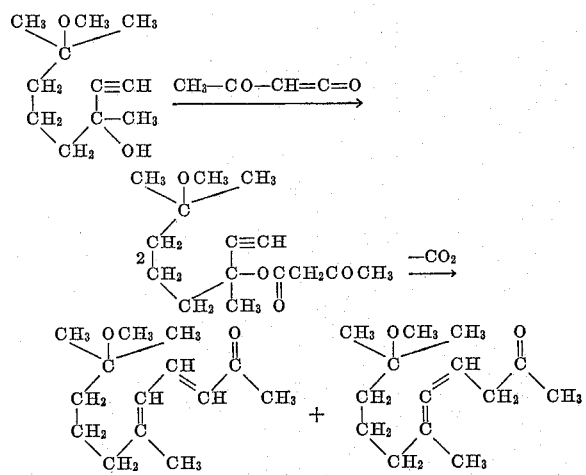

Suitable derivatives of acetoacetic acid are acetoacetic acid esters derived from alkanols having one to four carbon atoms and also the intramolecular anhydride of acetoacetic acid which is also known as diketene.

The reaction is carried out, for example, by adding the calculated amount of diketene to the ethinyl carbinol III, preferably at a temperature of from 0° to 30° C., and decarboxylating the intermediately formed acetoacetic acid ester of the ethinyl carbinol III in the liquid phase, advantageously at a temperature between 150° and 250° C. Decarboxylation may be carried out in the presence of inert solvents, having a high boiling point, such as decahydronaphthalene or neroline, and in the presence of acid or alkaline substances. Suitable acid substances are, for example, carboxylic acids, such as acetic acid, propionic acid and nicotinic acid. Suitable basic substances are aluminum alcoholates, such as aluminum isopropylate and aluminum secondary butylate, and also alkali alcoholates, such as potassium ethylate and sodium methylate. These catalysts are generally used in amounts of 0.1 to 3% by weight with reference to the acetoacetic acid ester of the ethinyl carbinol III.

The acetoacetic acid ester of the ethinyl carbinol III may also be split in the vapor phase at a temperature above 250° C., advantageously 300° to 500° C.

Reaction of the ethinyl carbinol III with an acetoacetic acid ester gives the new unsaturated ketones IV and V. This preferred reaction is advantageously carried out with the acetoacetic acid ester being used in an excess of, for example, 1.1 to 3 times the theoretical amount. The procedure may be, for example, by heating the two reactants, with or without acid or basic catalysts, in an inert solvent of high boiling point, at normal, moderately increased or reduced pressure until carbon dioxide is no longer split off. The alcohol contained in the acetoacetic acid ester escapes at the same time as the carbon dioxide. The acid or basic catalysts and the solvents used in this process are those specified above. The reaction temperatures are in general 150° to 250° C., preferably 160° to 200° C.

Especially good results are achieved by heating the acetoacetic acid ester, together with the catalyst if any, to the reaction temperature and then adding the alkinyl carbinol III at the rate at which it undergoes reaction with carbon dioxide and alcohol being split off.

Apparently, the reaction of the alkinyl carbinols III with an acetoacetic acid ester does not proceed preferentially via the acetoacetic acid esters of the alkinyl carbinol, these disengaging carbon dioxide less readily and giving poorer yields of ketones IV and V having a plurality of olefinic linkages.

It is surprising that reaction of alkinyl carbinols having ether structure with tertiary hydrocarbon radical can be carried out at the said high temperatures. It is known, for example, that the formation of such ethers from alcohols and isoolefines is reversible. It would therefore have been expected that at least partial destruction of the ether bridge would take place at the reaction temperatures. It is also surprising that no five-membered cyclic derivatives should be formed in the process. If unsaturated alkinyl carbinols, such as 2,6-dimethyloctene-(2)-ine-(7)-ol-(6), are reacted with an acetoacetic acid ester, an unsaturated five-membered cyclic ketone is obtained as well as the expected pseudoionone:

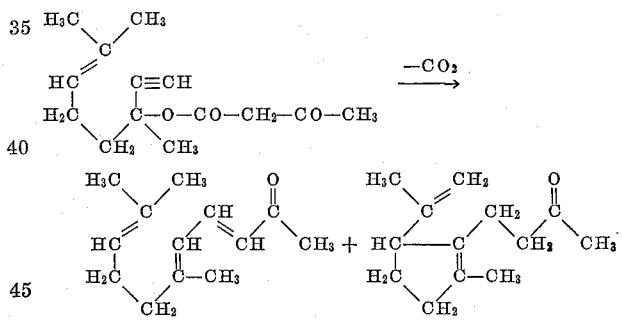

In the second stage of the process new unsaturated ketones of the Formula IV having 1,3-diene structure and unsaturated ketones of the Formula V having allene structure are concurrently formed as a rule, in about equimolar amounts. In the above formulae, $R_1$ and $R_2$ have the same meanings as in the Formula III. The mixtures may be separated by careful distillation, by chromatographic adsorption or by gas chromatography. It is also possible, however, to react the mixture in the third stage of the process to form ionone compounds without previously recovering the individual components.

The unsaturated ketones IV and V not only are valuable intermediates for the production of ionone compounds, but have also good odoriferous properties. They have a typical and lasting odor of green plants with an iris tinge and can therefore be used as perfumes or as components of perfume formulations.

In the third stage of the process according to this invention, the unsaturated ketones IV and V are cyclized in acid medium. Suitable acid reagents for the cyclization are inorganic and organic, strong or medium strength acids and also Friedel-Crafts catalysts. They are advantageously used in amounts of 10 to 3000% by weight with reference to the unsaturated ketones IV and V. Examples of acid reagents are sulfuric acid, phosphoric acid, p-toluene sulfonic acid, hydrogen fluoride, boron trifluoride, boron trifluoride etherate, aluminum chloride, zinc chloride and iron chloride. Coemployment of inert solvents or diluents, such as acetic acid, benzene, hydrocarbons, aliphatic or cycloaliphatic ethers or nitroalkanes, is advantageous.

Depending on the type of acid treatment applied α- or β-ionone compounds or a mixture of these substances are obtained, the mixture being separated into the pure components in conventional manner, if desired. Thus, when, concentrated sulfuric acid is used as an acid reagent, either by itself or in admixture with glacial acetic acid when working and/or a solvent, such as n-hexane, the β-compounds are almost exclusively obtained. On the contrary, when aqueous acids are used, such as 85% phosphoric acid or 60% sulfuric acid, or boron trifluoride α-isomers are formed in preponderant amount.

The preferred procedure in carrying out the third stage of the process is by introducing the initial material, either by itself or dissolved in a solvent, into the acid reagent which may also be diluted with a solvent with intense mixing. It is advantageous to work at a temperature between minus 80° C. and plus 80° C., preferably between minus 20° C. and plus 50° C. The reaction usually takes half an hour to three and half hours to complete. The reaction mixture is advantageously diluted with water and the organic layer is separated. The reaction product may be recovered in conventional manner by distillation.

It is surprising that, although ether bridges are present in the Compounds IV and V, the ionone Compounds VI and VII should be obtained with the same good yields as can be achieved by conventional methods. As a result the ionone compounds are now more readily accessible because the intermediate products IV and V can be prepared with better yields and in purer form than when made by conventional methods.

The ionone compounds obtainable by the process according to our invention are known to be valuable odoriferous substances and important intermediates for the production of compounds of the vitamin-A series and the carotene series.

The invention is illustrated by, but not limited to, the following examples in which the parts are by weight.

A. Examples illustrating the reaction of the first stage of the process:

*Example 1*

500 parts of methanol, 100 parts of sulfuric acid and 252 parts of 2-methylheptene-(2)-one-(6) are heated at 30° to 35° C. for fifty hours. The product is neutralized with solid sodium methylate and the precipitate is filtered off. The precipitate is washed with anhydrous methanol and the washing liquid united with the filtrate. The solvent is distilled off from the filtrate at reduced pressure, and the product distilled. In addition to a forerun, consisting mainly of unchanged 2-methylheptene-(2)-one-(6), 169 parts of 2-methoxy-2-methylheptanone-(6) with the boiling point 88° to 91° C. at 12 mm. Hg and the refractive index $n_D^{20}=1.4305$ to 1.4308 is obtained. The yield is 71% of the theory with reference to reacted 2-methylheptene-(2)-one-(6).

The 2-methoxy-2-methylheptanone-(6) dissolved in 400 parts of tetrahydrofuran, is reacted with acetylene at a pressure of 13 atmospheres, in the presence of 40 parts of sodium methylate at a temperature of 20° to 25° C. to give a yield of 90% of 2-methoxy-2,6-dimethyloctine-(7)-ol-(6) having the boiling point 87° to 89° C. at 87 mm. Hg.

*Example 2*

2000 parts of methanol, 1000 parts of 2-methylheptene-(2)-one-(6) and 500 parts of an ion exchanger containing sulfonic acid groups are stirred for sixteen hours at 50° to 60° C. The ion exchanger is filtered off and washed with methanol. The solvent is distilled off from the filtrate at reduced pressure. By fractionation of the residue, 817 parts of 2-methoxy-2-methylheptanone-(6) having the boiling point 85° to 87° C. at 9 mm. Hg and a little unchanged 2-methylheptene-(2)-one-(6) are obtained. The 2-methoxy-2-methylheptanone-(6) obtained is ethinylated in the way described in Example 1.

*Example 3*

640 parts of methanol, 260 parts of an ion exchanger containing sulfonic acid groups and 504 parts of 2-methylheptene-(2)-one-(6) are stirred for eighty hours at room temperature. The product is worked up as described in Example 2. 298 parts of unreacted methylheptenone of the boiling point 59° to 60° C. at 11 mm. Hg and 212 parts of 2-methoxy-2-methylheptanone-(6) having the boiling point 88° to 89° C. at 11 mm. Hg are obtained. The latter compound may be ethinylated as described in Example 1.

*Example 4*

320 parts of methanol, 60 parts of sulfuric acid, and 152 parts of 2,6-dimethyloctene-(2)-ine-(7)-ol-(6) are stirred at 25° to 28° C. for sixty hours. The product is worked up as described in Example 1. 116 parts of 2-methoxy-2,6-dimethyloctine-(7)-ol-(6) having the boiling point 75° to 78° C. at 0.3 mm. Hg are obtained by distillation. The refractive index of the product is $n_D^{20}=1.4560$ to 1.4565.

*Example 5*

320 parts of methanol, 160 parts of an ion exchanger containing sulfonic acid groups and 304 parts of 2,6-dimethyloctene-(2)-ine-(7)-ol-(6) are stirred for seventy hours at 25° to 28° C. The ion exchanger is filtered off and washed with methanol. The filtrate is concentrated at reduced pressure. The residue is fractionated through a column. After a forerun of 112 parts of unreacted acetylene alcohol having the boiling point 54° to 56° C. at 1.5 mm. Hg 209 parts of 2-methoxy-2,6-dimethyloctine-(7)-ol-(6) having the boiling point 86° to 88° C. at 1.5 mm. Hg are obtained.

*Example 6*

320 parts of methanol, 240 parts of an ion exchanger containing sulfonic acid groups and 304 parts of 2,6-dimethyloctene-(2)-ine-(7)-ol-(6) are heated for thirty hours at 40° C. while stirring. The product is worked up as described in Example 5. By distillation, 86 parts of unreacted acetylene carbinol having the boiling point 51° to 53° C. and 226 parts of 2-methoxy-2,6-dimethyloctine-(7)-ol-(6) having the boiling point 79° to 80° C. at 0.5 mm. Hg are obtained.

The following substances are obtained in an analogous manner with other alcohols:

| Alcohol | Reaction product | Boiling point, ° C. | Pressure, mm. Hg | Refractive index $n_D^{20}$ |
|---|---|---|---|---|
| Ethanol | 2-ethoxy-2,6-dimethyloctine-(7)-ol-(6). | 75–76 | 0.05 | 1.4530 |
| n-Butanol | 2-n-butoxy-2,6-dimethyloctine-(7)-ol-(6). | 81–82 | 0.05 | 1.4522 |
| Methyl glycol | 2-(β-methoxy-ethoxy)-2,6-dimethyloctine-(7)-ol-(6). | 96–98 | 0.05 | 1.4575 |
| Isopropanol | 2-isopropoxy-2,6-dimethyloctine-(7)-ol-(6). | 94–96 | 1.0 | 1.4541 |
| Ethylene glycol | 2-(β-hydroxy-ethoxy)-2,6-dimethyloctine-(7)-ol-(6). | 134–136 | 0.3 | 1.4701 |
| Allyl alcohol | 2-allyloxy-2,6-dimethyloctine-(7)-ol-(6). | 88–89 | 0.5 | 1.4625 |
| β-Phenylethyl alcohol. | 2-(β-phenylethoxy)-2,6-dimethyl-octine-(7)-ol-(6). | 135–136 | 0.08 | 1.5040 |

*Example 7*

100 parts of 2,6-dimethyloctene-(2)-ine-(7)-ol-(6), 2000 parts of methanol and 500 parts of an ion exchanger containing sulfonic acid groups are stirred for forty hours at 35° to 40° C. The ion exchanger is filtered off and the methanol distilled off. By fractionation 311 parts of the acetylene alcohol and 772 parts of 2-methoxy-2,6-dimethyloctine-(7)-ol-(6) having the boiling point 82° to 83° C. at 0.6 mm. Hg are obtained.

B. Examples illustrating the reaction of the second stage of the process:

Example 8

360 parts of the methyl ester of acetoacetic acid, 185 parts of 2-methoxy-2,6-dimethyloctine-(7)-ol-(6) and 0.2 part of aluminum isopropylate are heated to 170° to 175° C. while stirring, 61 parts of methanol distilling off and carbon dioxide being disengaged. The whole is stirred for another two hours at 180° to 185° C. and then cooled. 200 parts of petroleum ether are then added and the product is washed once with 2 N caustic soda solution and twice with water. The organic layer is dried with sodium sulfate, filtered and the solvent evaporated. The residue is distilled and 173 parts of an equimolar mixture of 2-methoxy-2,6-dimethylundecanediene-(6,8)-one-(10) and 2-methoxy-2,6-dimethylundecanediene-(6,7)-one-(10) having the boiling point 118° to 130° C. at 1.5 mm. Hg absolute. The refractive index of the mixture varies between 1.5030 and 1.5060. The yield is 76 to 77% of the theory with reference to the alkinyl carbinol.

The said mixture is obtained with a yield of 71% of the theory when the initial material is reacted with the molar amount of diketene and the intermediately formed acetoacetic acid ester of the initial material is decarboxylated and rearranged by heating at 185° C. for 8 hours.

From 2-(β-hydroxyethoxy)-2,6-dimethyloctin-(7)-ol-(6) an about equimolecular mixture of 2-(β-hydroxyethoxy)-2,6-dimethylundecadien-(6,7)-one-(10) and 2-(β - hydroxyethoxy) - 2,6-dimethylundecadien-(6,8)-one-(10) is obtained in an analogous manner.

Example 9

390 parts of the ethyl ester of acetoacetic acid is heated to 175° C. and 185 parts of 2-methoxy-2,6-dimethyloctine-(7)-ol-(6) added gradually in the course of three hours. Carbon dioxide is split off and 84 parts of ethanol distil off from the reaction mixture. 216 parts of the ethyl ester of acetoacetic acid are recovered by distillation. The residue is fractionated and 177 parts of the mixture described in Example 8 having the boiling point 109° to 120° C. at 0.3 mm. Hg absolute are obtained.

The isomer mixture can be decomposed by careful fractional rectification in a packed column, 2-methoxy-2,6-dimethylundecadien-(6,7)-one-(10) with the boiling point 92° to 95° C. at 0.1 mm. Hg and the refractive index $n_D^{20}$=1.4880 and 2-methoxy-2,6-dimethylundecadien-(6,8)-one-(10) with the boiling point 103° to 106° C. at 0.1 mm. Hg and the refractive index $n_D^{20}$=1.5150 being obtained in about equal amounts.

In an analogous manner 2-n-butoxy-2,6-dimethyloctin-(7)-ol-(6) may be reacted to form an about equimolecular mixture of 2-n-butoxy-2,6-dimethylundecadien-(6,7)-one-(10) and 2-n-butoxy-2,6-dimethylundecadien-(6,8)-one-(10) which may also be reacted by distillation.

Example 10

400 parts of the ethyl ester of acetoacetic acid is heated to 175° to 180° C. and 370 parts of 2-methoxy-2,6-dimethyloctin-(7)-ol-(6) is added in the course of two hours while stirring, 90 parts of ethanol distilling off with carbon dioxide being disengaged. The whole is stirred for another two hours at 185° to 190° C. and then 177 parts of ethyl acetoacetate are distilled off. 332 parts of the mixture described in Example 8 is obtained from the residue by distillation.

From 2 - (β - methoxyethoxy) - 2,6 - dimethyloctin-(7)-ol-(6) a mixture of 2-(β-methoxyethoxy)-2,6-dimethylundecadien-(6,7)-one-(10) and 2-(β-methoxyethoxy)-2,6-dimethylundecadien-(6,8)-one-(10) is obtained in analogous manner.

2-allyloxy-2,6-dimethyloctin-(7)-ol-(6) will give 2-allyloxy-2,6-dimethylundecadien-(6,7)-one-(10) and 2-allyloxy - 2,6 - dimethylundecadien - (6,8) - one - (10), while 2-(β-phenylacetoxy)-2,6-dimethyloctin-(7)-ol-(6) may be reacted in analogous manner to form 2-(β-phenylethoxy)-2,6-dimethylundecadiene-(6,7)-one-(10) and 2-(β-phenylethoxy-2,6-dimethylundecadien-(6,8)-one-(10).

C. Examples illustrating the reaction of the third stage of the process:

Example 11

112 parts of 2-methoxy-2,6-dimethylundecadien-(6,8)-one-(10) in 100 parts of n-hexane is introduced within an hour into a mixture of 300 parts of concentrated sulfuric acid and 130 parts of glacial acetic acid cooled to 0° C. while stirring. The mixture is stirred for another two hours at 0° C. and then poured into 200 parts of ice and 200 parts of n-hexane. The organic layer is separated and washed with 10% caustic soda solution and then with water. The produce is dried over sodium sulfate and the n-hexane is distilled off. 78 parts of β-ionone having the boiling point 91° to 96° C. at 1.0 mm. Hg and the refractive index $n_D^{20}$=1.5194 are obtained by fractional distillation.

In an analogous manner β-ionone is obtained from a mixture of 2-(β-hydroxyethoxy)-2,6-dimethylundecadien-(6,7)-one-(10) and 2-(β-hydroxyethoxy)-2,6-dimethylundecadien-(6,8)-one-(10). The isomer 2,6-dimethylundecadien-(6,7)-ones-(10) and 2,6-dimethylundecadien-(6,8)-ones-(10) which bear an allyloxy or β-phenylethoxy radical in 2-position may also be cyclized to form β-ionone in analogous manner.

Example 12

225 parts of an equimolar mixture of 2-methoxy-2,6-dimethylundecadiene-(6,8)-one-(10) and 2-methoxy-2,6-dimethylundecadiene-(6,7)-one-(10) in 200 parts of n-hexane are added while stirring at minus 10° C. in the course of an hour to a mixture of 1000 parts of concentrated sulfuric acid and 600 parts of n-hexane. The temperature is allowed to rise to 0° C. and the mixture is then poured into 2000 parts of ice and 800 parts of n-hexane. The product is worked up as described in Example 11 and distilled. 158 parts of β-ionone are obtained having the boiling point 86° to 91° C. at 0.5 mm. Hg and the refractive index $n_D^{20}$=1.5188 and 1.5196.

In an analogous manner mixtures of 2-(β-methoxyethoxy)-2,6-dimethylundecadien-(6,7)-one-(10) and 2-(β - methoxyethoxy) - 2,6 - dimethylundecadien - (6,8)-one-(10) may be cyclized to form β-ionone.

Example 13

120 parts of 2-methoxy-2,6-dimethylundecadien-(6,8)-one-(10) is fed into 500 parts of 85% phosphoric acid at 30° C. in the course of 30 minutes while stirring intensely. Stirring is continued for 30 minutes at the same temperature and the mixture then poured onto 500 parts of n-hexane and 500 parts of ice. After having been worked up as described in Example 11 the mixture is distilled, 69 parts of α-ionone with the boiling point 80° to 83° C. and the refractive index $n_D^{20}$=1.4998 being obtained.

In an analogous manner α-ionone is obtained from the mixture of 2-butoxy-2,6-dimethylundecadien-(6,7)-one-(10) and 2-butoxy-2,6-dimethylundecadien-(6,8)-one-(10).

Example 14

Using 128 parts of 2-methoxy-2,3,6-trimethylundecadien-(6,7-one-(10) and reacting it by the method described in Example 13, 70 parts of a distillate with the boiling point 94° to 96° C. at 1 mm. Hg and the refractive index $n_D^{20}$=1.5015 is obtained which mainly consists of α-irone.

We claim:
1. A process for the production of α- and β-ionone compounds selected from the group consisting of compounds having the formulae

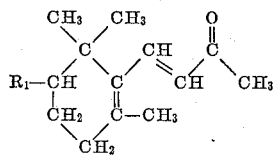

and

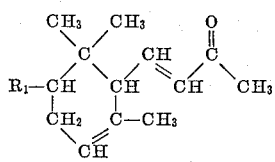

wherein $R_1$ represents a member selected from the group consisting of hydrogen and methyl, which comprises
(a) reacting an ethinyl carbinol selected from the group consisting of ethinyl carbinols having the formulae

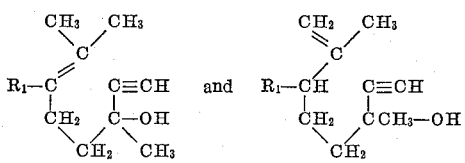

wherein $R_1$ has the same meaning as above, with an alcohol having the formula $R_2OH$, wherein $R_2$ is a member selected from the group consisting of alkyl of 1–12 carbons, alkoxyalkyl with 1–4 carbons in the alkoxy group and 1–12 carbons in the alkyl group, monohydroxy alkyl with 2–12 carbons, dihydroxy alkyl with 3–12 carbons, alkenyl with 3–12 carbons, alkoxyalkenyl with 1–4 carbons in the alkoxy group and 3–12 carbons in the alkenyl group, aralkyl with 7–9 carbons, cyclopentyl and cyclohexyl, in an acid medium selected from the group consisting of strong and medium strength inorganic acids, strong and medium strength organic acids and Friedel-Crafts catalysts at a temperature between 0° and 120° C.;
(b) reacting the ethinyl carbinol so obtained containing an ether bridge and having the formula

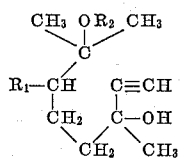

wherein $R_1$ and $R_2$ have the same meanings as above, with an acetoacetic acid derivative selected from the group consisting of diketene and acetoacetic acid esters derived of alkanols with 1 to 4 carbon atoms at a temperature between 150° and 500° C.; and
(c) cyclizing in an acid medium selected from the group consisting of strong and medium strength inorganic acids, strong and medium strength organic acids and Friedel-Crafts catalysts at least one of the compounds obtained in step (b) and being selected from the group consisting of unsaturated ketones having the formulae

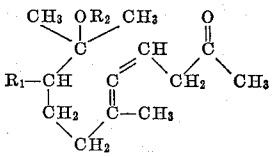

and

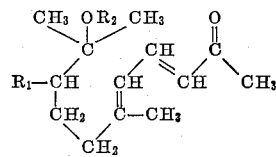

wherein $R_1$ and $R_2$ have the same meanings as above, at a temperature of between minus 80° and plus 80° C.

2. A process for the production of α- and β-ionone compounds selected from the group consisting of compounds have the formulae

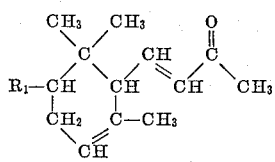

and

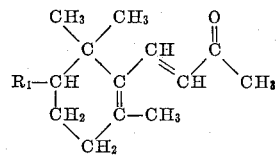

wherein $R_1$ represents a member selected from the group consisting of hydrogen and methyl, which comprises cyclizing in an acid medium selected from the group consisting of strong and medium strength inorganic acids, strong and medium strength organic acids and Friedel-Crafts catalysts at least one of the compounds selected from the group consisting of unsaturated ketones having the formulae

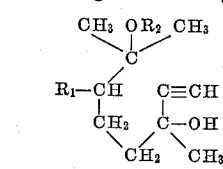

and

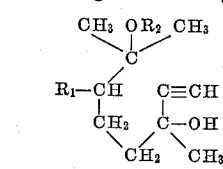

wherein $R_1$ is a member selected from the group consisting of hydrogen and methyl and $R_2$ is a member selected from the group consisting of alkyl of 1-12 carbons, alkoxyalkyl with 1-4 carbons in the alkoxy group and 1-12 carbons in the alkyl group, monohydroxy alkyl with 2-12 carbons, dihydroxy akyl with 3-12 carbons, alkenyl with 3-12 carbons, alkoxyalkenyl with 1-4 carbons in the alkoxy group and 3-12 carbons in the alkenyl group, aralkyl with 7-9 carbons, cyclopentyl and cyclohexyl, at a temperature of between minus 80° and plus 80° C.

3. A process for the production of ethinyl carbinols containing an ether bridge and having the formula wherein $R_1$ is a member selected from the group consisting of hydrogen and methyl and $R_2$ is a member selected from the group consisting of aliphatic, cycloalphatic and araliphatic radicals, which comprises reacting an ethinyl carbinol selected from the group consisting of ethinyl carbinols having the general formulae

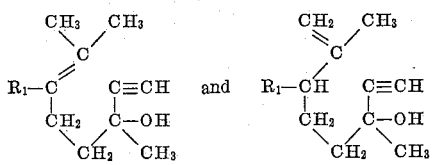

wherein $R_1$ has the same meaning as above, with an alcohol having the general formula $R_2OH$, wherein $R_2$ is a member selected from the group consisting of alkyl of 1-12 carbons, alkoxyalkyl with 1-4 carbons in the alkoxy group and 1-12 carbons in the alkyl group, monohydroxy alkyl with 2-12 carbons, dihydroxy alkyl with 3-12 carbons, alkenyl with 3-12 carbons, alkoxyalkenyl with 1-4 carbons in the alkoxy group and 3-12 carbons in the alkenyl group, aralkyl with 7-9 carbons, cyclopentyl and cyclohexyl, in an acid medium at a temperature between 0° and 120° C.

4. Unsaturated ketones having the formula

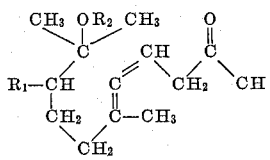

wherein $R_1$ is a member selected from the group consisting of hydrogen and methyl and $R_2$ is a member selected from the group consisting of alkyl of 1-12 carbons, alkoxyalkyl with 1-4 carbons in the alkoxy group and 1-12 carbons in the alkyl group, monohydroxy alkyl with 2-12 carbons, dihydroxy alkyl with 3-12 carbons, alkenyl with 3-12 carbons, alkoxyalkenyl with 1-4 carbons in the alkoxy group and 3-12 carbons in the alkenyl group, aralkyl with 7-9 carbons, cyclopentyl and cyclohexyl.

5. Unsaturated ketones having the formula

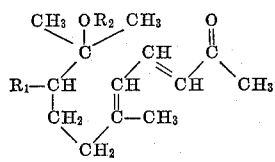

wherein $R_1$ is a member selected from the group consisting of hydrogen and methyl and $R_2$ is a member selected from the group consisting of alkyl of 1-12 carbons, alkoxyalkyl with 1-4 carbons in the alkoxy group and 1-12 carbons in the alkyl group, monohydroxy alkyl with 2-12 carbons, dihydroxy alkyl with 3-12 carbons, alkenyl with 3-12 carbons, alkoxyalkenyl with 1-4 carbons in the alkoxy group and 3-12 carbons in the alkenyl group, aralkyl with 7-9 carbons, cyclopentyl and cyclohexyl.

6. Ethinylcarbinols having the formula

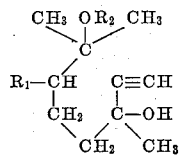

wherein $R_1$ is a member selected from the group consisting of hydrogen and methyl and $R_2$ is a member selected from the group consisting of alkyl of 1-12 carbons, alkoxyalkyl with 1-4 carbons in the alkoxy group and 1-12 carbons in the alkyl group, monohydroxy alkyl with 2-12 carbons, dihydroxy akyl with 3-12 carbons, alkenyl with 3-12 carbons, alkoxyalkenyl with 1-4 carbons in the alkoxy group and 3-12 carbons in the alkenyl group, aralkyl with 7-9 carbons, cyclopentyl and cyclohexyl.

7. A process for the production of α- and β-ionone compounds selected from the group consisting of compounds having the formulae

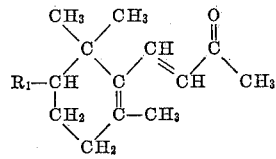

and

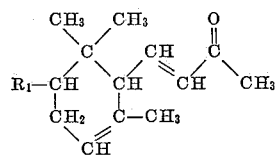

wherein $R_1$ represents a member selected from the group consisting of hydrogen and methyl, which comprises cyclizing in an acid medium selected from the group consisting of strong and medium strength inorganic acids, strong and medium strength organic acids and Friedel-Crafts catalysts an unsaturated ketone of the formula

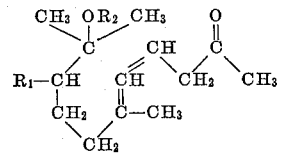

wherein $R_1$ has the meaning stated above and $R_2$ is a member selected from the group consisting of alkyl of 1–12 carbons, alkoxyalkyl with 1–4 carbons in the alkoxy group and 1–12 carbons in the alkyl group, monohydroxy alkyl with 2–12 carbons, dihydroxy alkyl with 3–12 carbons, alkenyl with 3–12 carbons, alkoxyalkenyl with 1–4 carbons in the alkoxy group and 3–12 carbons in the alkenyl group, aralkyl with 7–9 carbons, cyclopentyl and cyclohexyl at a temperature between minus 80° C. and plus 80° C.

8. A process for the production of α- and β-ionone compounds selected from the group consisting of compounds having the formulae

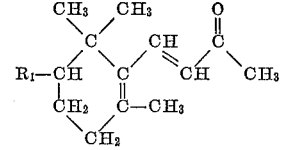

and

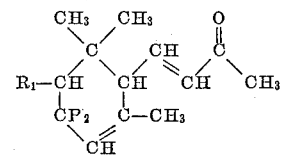

wherein $R_1$ represents a member selected from the group consisting of hydrogen and methyl, which comprises cyclizing in an acid medium selected from the group consisting of strong and medium strength inorganic acids, strong and medium strength organic acids and Friedel-Crafts catalysts an unsaturated ketone mixture of ketones of the formulae

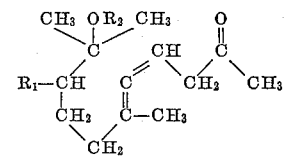

and

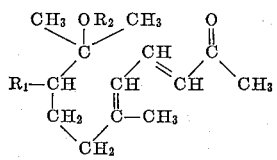

wherein $R_1$ has the meaning above stated and $R_2$ is a member selected from the group consisting of alkyl of 1–12 carbons, alkoxyalkyl with 1–4 carbons in the alkoxy group and 1–12 carbons in the alkyl group, monohydroxy alkyl with 2–12 carbons, dihydroxy alkyl with 3–12 carbons, alkenyl with 3–12 carbons, alkoxyalkenyl with 1–4 carbons in the alkoxy group and 3–12 carbons in the alkenyl group, aralkyl with 7–9 carbons, cyclopentyl and cyclohexyl at a temperature between minus 80° C. and plus 80° C.

References Cited by the Examiner
UNITED STATES PATENTS 2,661,368 12/1953 Kimel et al. _____ 260—595 X
2,996,552 8/1961 Blumenthal _____ 260—615 X

OTHER REFERENCES

Barton et al., J. Chem. Soc. (London), pp. 271–2 (1960).

La Forge et al., J. Org. Chem., vol. 17, 457–66 (1952).

LEON ZITVER, *Primary Examiner.*